United States Patent [19]
Nemeth et al.

[11] 3,812,568
[45] May 28, 1974

[54] APPARATUS FOR THE APPLICATION OF SHRINK TUBING

[75] Inventors: Edward Nemeth, Fairlawn; Joseph Gromek, East Paterson, both of N.J.

[73] Assignee: VIP Machinery Inc., Paterson, N.J.

[22] Filed: Feb. 12, 1973

[21] Appl. No.: 331,822

[52] U.S. Cl............................................. 29/203 D
[51] Int. Cl............................................ H01r 43/00
[58] Field of Search........ 29/203 D, 203 DT, 202.5, 29/203 P

[56] References Cited
UNITED STATES PATENTS
3,537,167  11/1970  Lawson............................ 29/203 D
3,570,097  3/1971  Bowden, Jr. et al............. 29/203 D

*Primary Examiner*—Thomas H. Eager
*Attorney, Agent, or Firm*—Amster & Rothstein

[57] ABSTRACT

Apparatus for applying heat shrinkable tubing to wire assemblies and similar objects includes a feeding device for feeding individual sections of shrink tubing to a waiting position in front of an operator and a lateral conveyor having a pickup point adjacent the waiting position for carrying the tube covered assembly through a heating section wherein the tubing is shrunk around the end of the assembly to be encapsulated. The apparatus is designed to function with a wide range of wire sizes and tubing types.

7 Claims, 10 Drawing Figures

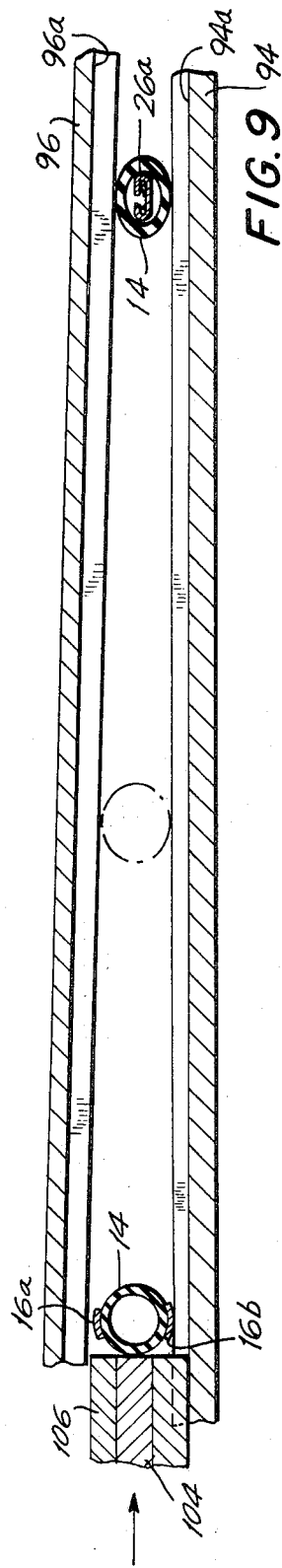
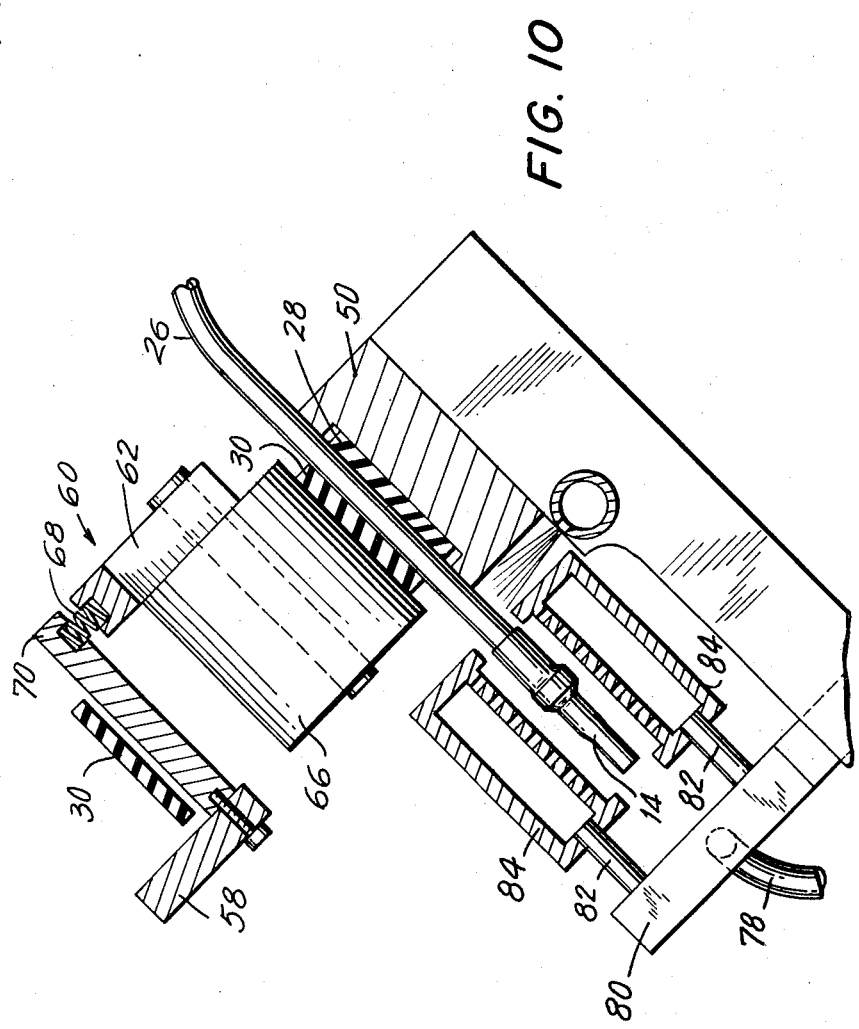

APPARATUS FOR THE APPLICATION OF SHRINK TUBING

This invention relates generally to the fabrication of electrical wire assemblies and similar objects and more specifically to apparatus for partially automating the application of shrink tubing to such objects.

The use of heat shrinkable tubing for protecting electrical wire connections and similar objects is well known. Shrink tubing generally comprises tubular sections of shrinkable plastic material having the property of "elastic memory." These tubes are generally manufactured from small diameter tubes which are enlarged under controlled conditions so that they tend to shrink back toward their initial diameter when exposed to controlled heat. Shrink tubing is generally available in a variety of lengths and diameters, it being understood that in any specific application, the length and diameter tubing selected is dimensionally oversized with respect to the object being encapsulated so that the object can be easily inserted in the tube. Typically, an electrical connection would be encapsulated by applying a section of shrink tubing over the connection and exposing the tubing to a forced hot air heater for a few seconds. The heat shrinks the tubing around the electrical connection and the adjacent portions of electrical cable, electrically insulating the connection.

While the use of shrink tubing on wire joints and other connections in electrical assemblies has been found particularly desirable, the application of shrink tubing to each connection or joint in a complex electrical system is a very time consuming hand procedure adding substantial labor costs to the costs of producing such products. Typically, each piece of shrink tubing must be placed over each electrical connection by hand with the tubing being hand held in front of a forced hot air heater until the desired shrinkage is obtained. By this method, even a skilled worker cannot perform this job effectively.

It is a principal object of the present invention to permit the application of shrink tubing to electrical wire assemblies and the like in a more efficient manner than has heretofore been possible and to substantially reduce the labor cost involved in the fabrication of such products. A further object of the invention is to permit an operator to apply shrink tubing to electrical connections and similar objects in a more uniform, consistent and safe manner than has heretofore been possible.

In accomplishing these and other objects in accordance with the present invention applicants' device includes means for feeding individual sections of shrink tubing to a waiting position adjacent an operator, a lateral conveyor having a pick up point adjacent said waiting position for conveying a wire assembly inserted in the waiting shrink tubing section away from the operator and heating means for shrinking the tubing as it is transported by the conveyor.

Further objects, features and advantages of the present invention will be more fully appreciated by reference to the following detailed description of a presently preferred embodiment in accordance with the present invention, when taken in conjunction with the appended drawings, wherein.

Figure 2:
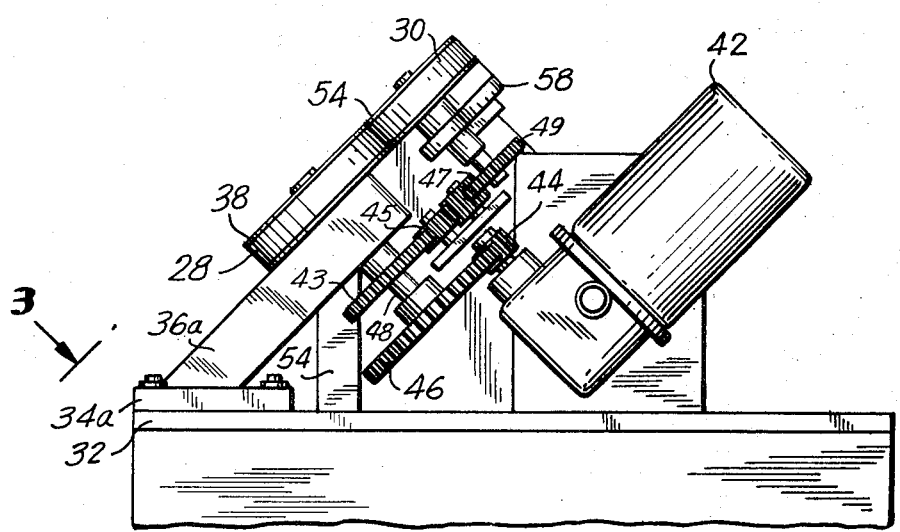
FIG. 2 is an end view of the conveyor portion of applicants' shrink tube applicator with the cover plate removed.
Figure 3:
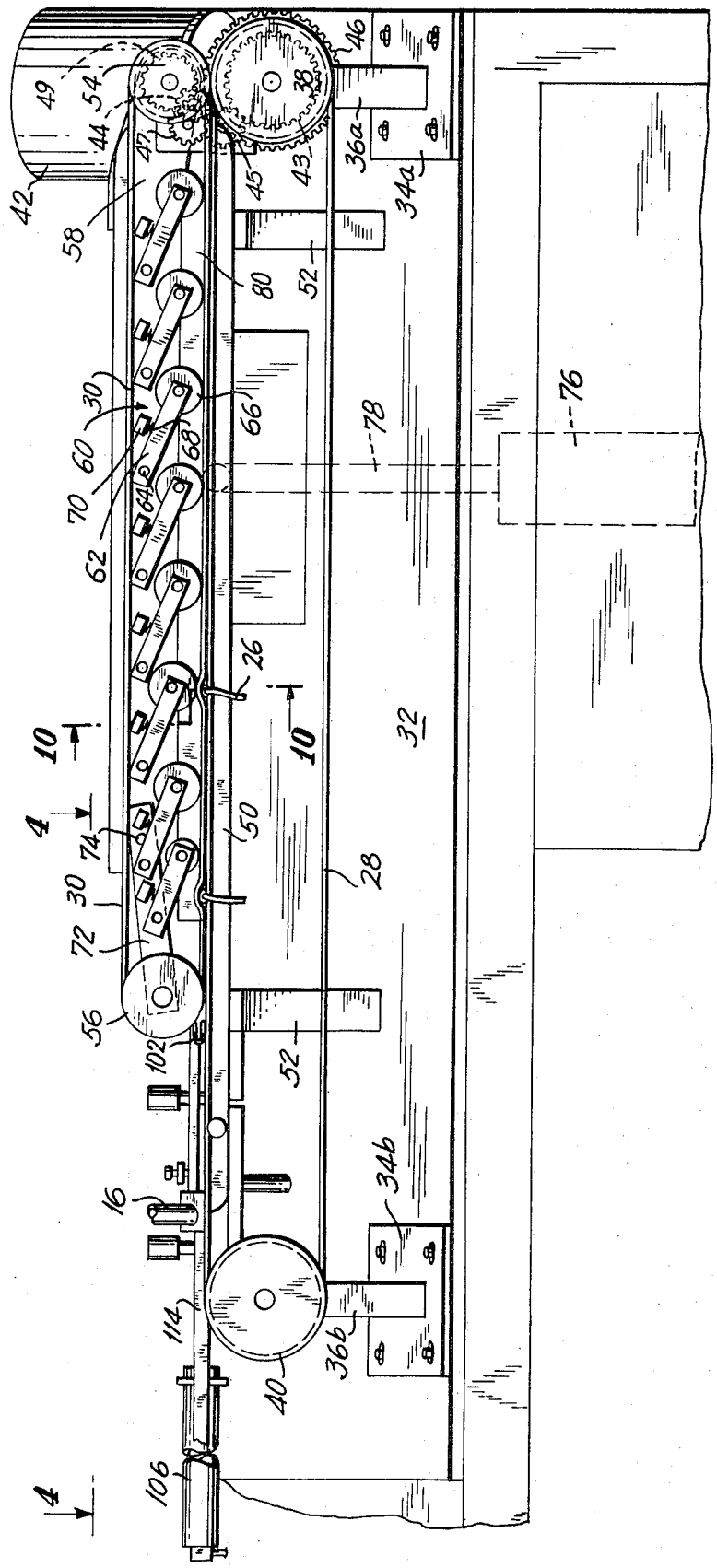
Figure 4:
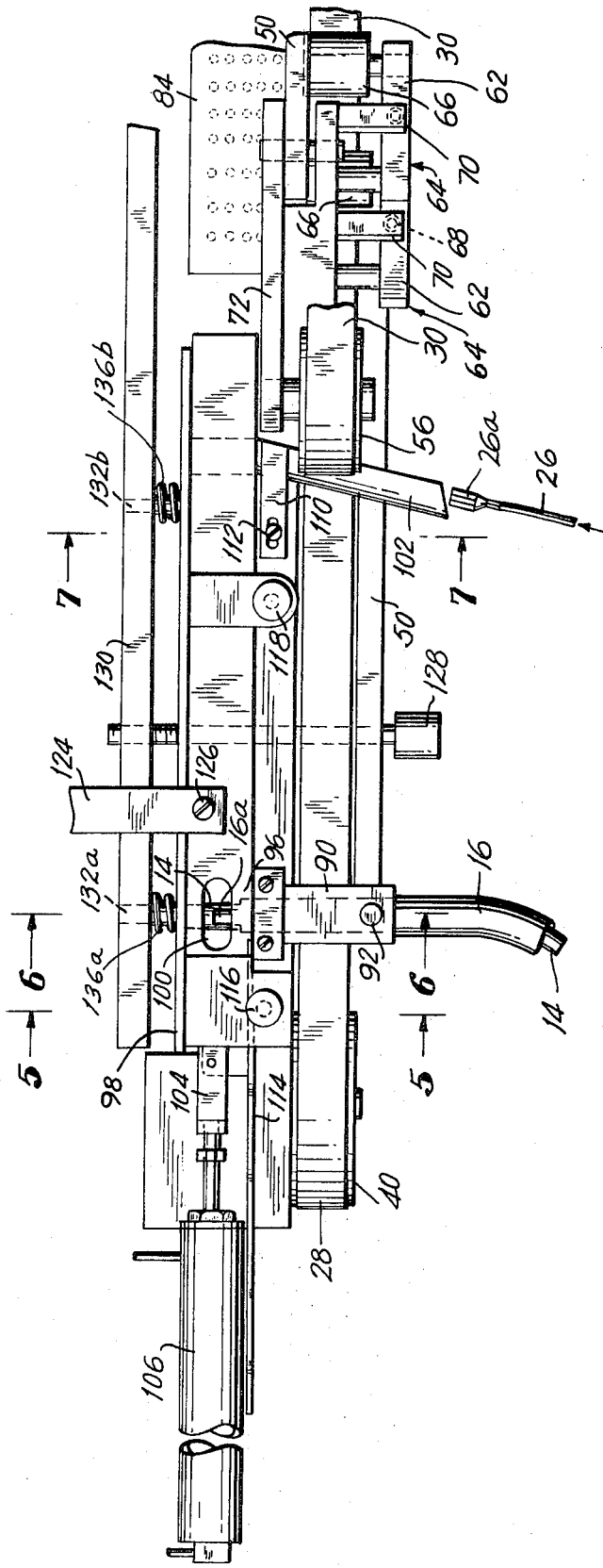
Figure 5:
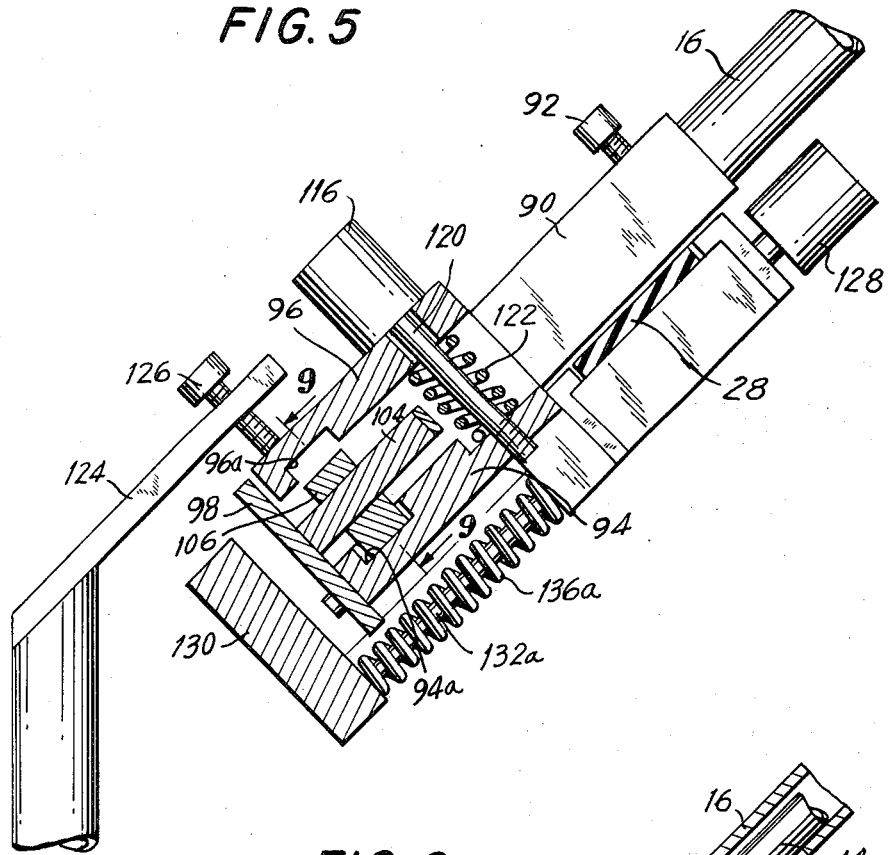
Figure 6:
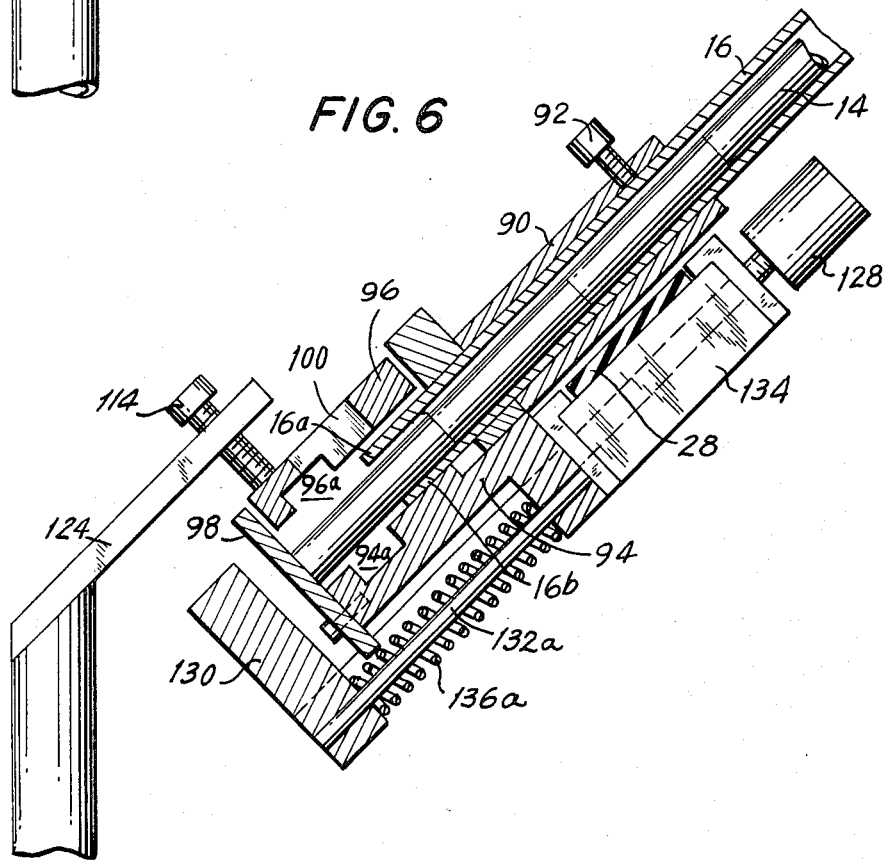
Figure 7:
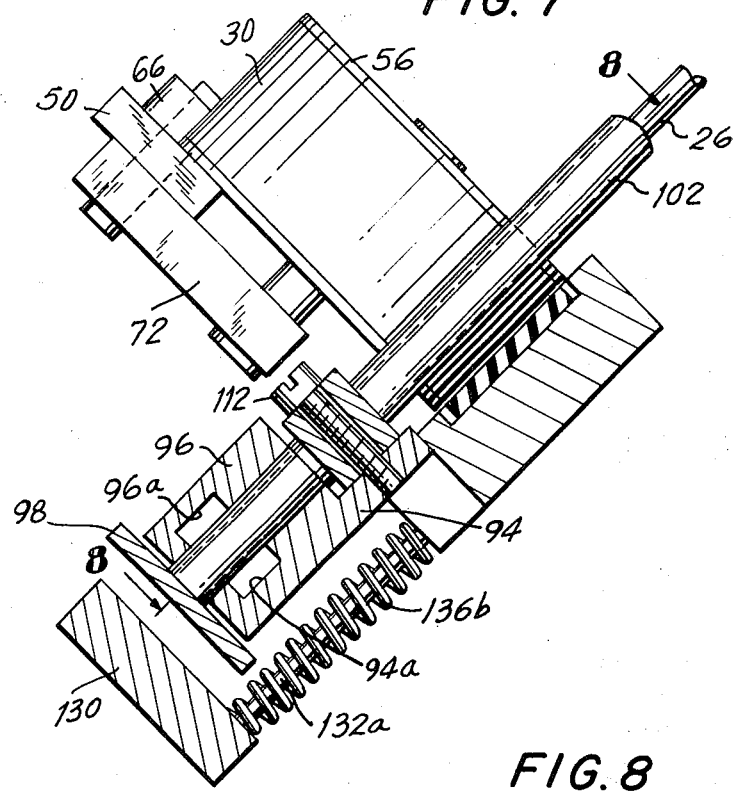
Figure 8:
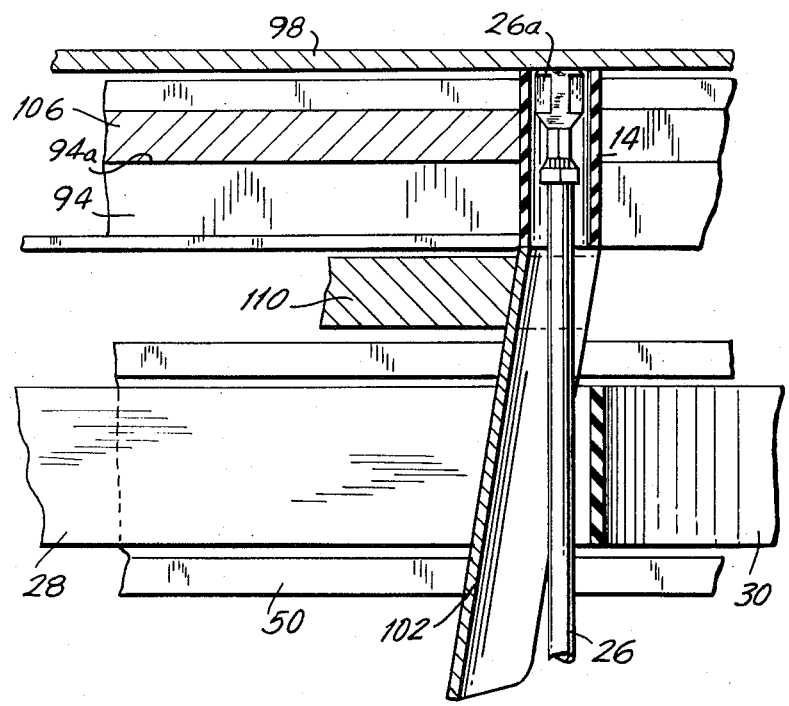

FIG. 3 is a view taken along line 3—3 in FIG. 2;
FIG. 4 is a view taken along line 4—4 in FIG. 3;
FIG. 5 is a view taken along line 5—5 in FIG. 4;
FIG. 6 is a view taken along line 6—6 in FIG. 4;
FIG. 7 is a view taken along line 7—7 in FIG. 4;
FIG. 8 is a view taken along line 8—8 in FIG. 7;
FIG. 9 is a view taken along line 9—9 in FIG. 5; and FIG. 10 is a view taken along line 10—10 in FIG. 3.

Figure 1:
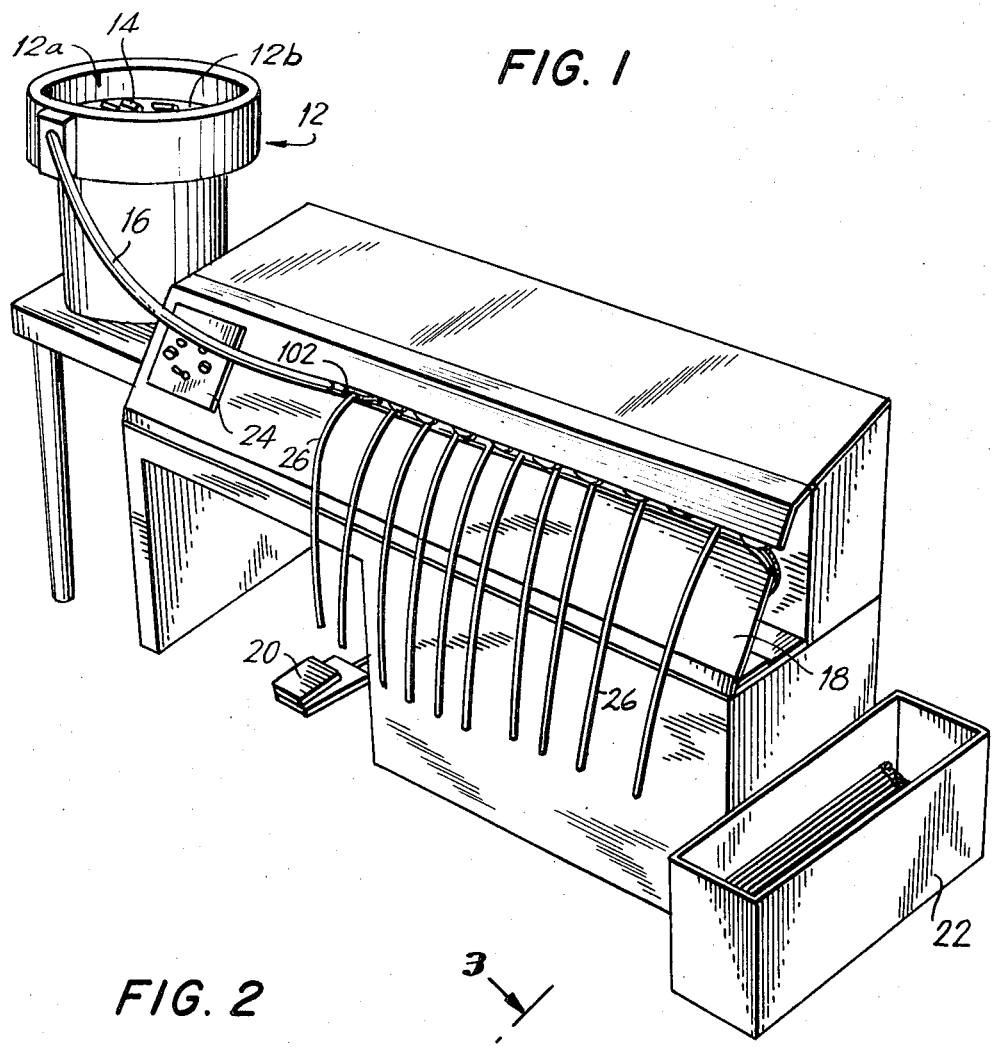
FIG. 1 is a perspective view of applicants' shrink tube applicator.

FIG. 1 shows the exterior construction of applicants' shrink tube applicator 10 and the relative position of the various elements of the device with respect to one another and with respect to the position of the machine operator. The system includes a vibratory feeder 12 or other known feed device which directs a continuous flow of shrink tube pieces 14 through a feed tube 16 to a position adjacent a waiting position in applicants' device. The operator is generally positioned directly in front of this waiting position and can thus conveniently control the feeding of shrink tube pieces within the machine by use of a foot pedal 20 in a manner to be described hereinafter.

Feeder 12 shown in the drawing is a conventional commercially available vibratory feed device of a type well known in the art and the method of operation of this device will not be described in detail. The entire object of the feed device in the present invention is to assure a continuous flow of shrink tube pieces in feed tube 16. In the normal operation of applicants' system, tube 16 contains a waiting line of shrink tube pieces throughout its length with the shrink tube pieces being gravity fed through the tube to the desired position in applicants' equipment. As is apparent from FIG. 1, feed tube 16 delivers the individual shrink tube pieces to applicants' device in a position perpendicular to the flow of work in applicants' device such that an open end of the shrink tube section at the working position is facing the operator standing in front of applicants' machine.

The present invention does not make electrical connections. It is intended only to cover connections already made primarily between two or more wire elements. These connections may be simple solder joints, but are more frequently connections made with some form of metal connector. In accordance with applicants' invention, an operator takes a wire assembly 26 including an electrical connection from a bin or other location (not shown), inserts the connection in the section of shrink tubing at the waiting position in applicants' device and moves the wire assembly including the shrink tubing section loosely positioned thereon to the right where it is picked up by a lateral conveyor system (not visible in FIG. 1 because of face plate 18) which securely grasps the wire assembly adjacent the electrical connection and transports it laterally through a heating zone (also hidden behind plate 18 in FIG. 1), where the tube section shrinks around the electrical connection. In the drawing, wire assembly 26 is shown as a single length of wire with a connector on its end (see FIG. 8 for the connector in detail). This is by way of example only and in actual operation other assemblies can be easily handled. The covered connection and its associated wire elements are then deposited by the conveyor system in a collection bin 22 for a later stage of processing.

The various controls for applicants' equipment are mounted on a control panel 24 in the front of the operator position.

Applicants' device can functionally be divided roughly into two major sections—a positioning and insertion section wherein pieces of shrink tubing are prepared and positioned before an operator for manual insertion of the part to be covered and a conveyor section wherein the wire element with a loosely fitted shrink tubing section mounted thereon is transported through appropriate heaters to shrink the tubing around the connector. The relationship between the inserting section of applicants' device and the conveyor section is best seen in FIG. 3. Details of the conveyor section are shown in FIGS. 2, 3 and 10 and the details of the inserting section are best seen in FIGS. 4, 5, 6, 7, 8 and 9. In order to provide a foundation for understanding the various adjustments provided in the positioning section, the conveyor section will be described first.

Applicants' conveyor system is designed to grasp a wire assembly immediately after it has been inserted in a shrink tube element and to transport the assembly through the heating station. Referring to FIG. 2, which is an end view looking from right to left in FIG. 1, and FIG. 3, which is a front view (along line 3—3 in FIG. 2) of the conveyor area with the face plate 18 removed, the conveyor system comprises a lower conveyor belt 28 and an upper conveyor belt 30 with the individual wire assemblies being carried therebetween. Lower belt 28 is supported above base plate 32 by support plates 34a, 34b bolted to plate 32 and upstanding conveyor support arms 36a, 36b. Support arm 36a carries the lower conveyor drive disk 38, and support arm 36b carries the lower conveyor return disk 40. Drive disk 38 is driven by motor 42 operating through gear 44 which meshes with drive gear 46 on a common axle 48 with lower conveyor drive disk 38. Motor 42 incorporates a conventional gear box to establish the desired turning speed.

The lower conveyor 28 is supported along its upper course by a fixed transverse support plate 50 which extends substantially from the waiting position to adjacent the end of the conveyor. Support plate 50 is mounted on upright posts 42 and provides a firm undersupport for the upper course of the lower conveyor belt.

The upper conveyor belt 30 is carried by rollers 54 and 56 mounted on back plate 58, with roller 54 being driven by motor 42 through a gear train including gears 43, 45, 47 and 49. Conveyor belts 28 and 30 are thus driven in opposite directions at substantially the same speed such that the sections of the belts that are in contact move together without slippage. To maintain adequate tensed contact between the lower course of upper conveyor 30 and the upper course of the lower conveyor 28, a series of spring-loaded roller arms 60 are provided to urge the lower course of upper belt 30 downwardly into contact with belt 28 over fixed support plate 50. Each roller arm includes an arm member 62 pivoted to back plate 58 at 64, an engaging roller at the end of arm 62 and compressed spring 68 supported against a stop 70. Spring 68 urges arms 62 downwardly in a clockwise direction. It has been found that roller arms spaced as shown in FIG. 3 provide very adequate support for the wire assemblies being transported.

As will be seen in FIG. 3, the left hand upper conveyor roller 56 is mounted on an arm 72 which is pivoted at 74 to back plate 58. Tension in upper belt 30 thus maintains roller 56 and the upper conveyor belt 30 in hard friction contact with lower conveyor 28 at the nip of roller 56 on conveyor 28. The first two roller arms 60 are mounted on pivot arm 72 to insure adequate contact between the upper and lower belts in this area.

FIG. 10 shows a cross-section at a typical point (line 10—10 in FIG. 3) along the conveyor section of applicants' device. This view clearly shows the relationship between the fixed support plate 50, the upper course of the lower conveyor belt 28, the lower course of the upper conveyor belt 30 and the engaging roller 66 of the roller arms 60. This view also shows the structure of each roller arm 60 with spring 68 maintaining the roller arm in tensed contact with belt 30. Note that fixed support plate 50 includes a cutout section adapted to receive the upper course of lower conveyor 28.

As will be apparent from FIG. 10, the conveyor section of applicants' system grasps the wire assembly 26 on the wire portion adjacent the wire and bearing the connector. As shown in FIG. 10, the shrink tube 14 has already been considerably heated and has shrunk to conform to and encapsulate the very end of wire 26 and the electrical connector which is attached thereto.

Comparing FIGS. 10 and 3, it will be seen that in the embodiment shown, heat is generated by a heating element 76 remote from the conveyor unit and is transported through a blower tube 78 to a heating manifold 80 behind the conveyor. Manifold 80 communicates through a series of heating tubes 82 with a pair of transverse heating elements 84 which are mounted rearwardly of the conveyor system above and below the end of wire 26 carrying the shrink tube and electrical connector 26a. The facing surfaces of upper and lower heating elements 84 include a plurality of apertures through which heated air is directed against the heat shrink tube. It will be appreciated that although the present embodiment shows forced air heaters and a manifold system for providing heat other heating methods may be employed within the scope of applicants' invention. For example, radiant heaters appropriately positioned behind the conveyor system may be employed.

Referring to the insertion section, the shrink tubing pieces 14 are fed through tube 16 and emerge from the forward end of the tube as best seen in the cross sectional view of FIG. 6. The forward end of the tube has its side portions cut away so that the shrink tube element can be moved laterally. At its end, the tube includes only small top and bottom sections 16a and 16b. Tube 16 is securely retained within a fitting 90 by set screw 92. Fitting 90 and set screw 92 maintain the open end of tube 16 in a fixed position with respect to the remainder of the system. The forwardmost shrink tube element in tube 16 emerges from the forward end of the tube into a horizontal channel defined by lower plate 94 and upper plate 96 (see FIGS. 5, 6 and 7). The shrink tube is maintained in this position by stop plate 98 which is permanently fixed to channel bottom plate 94 and closes the back of the channel. An aperture 100 is provided in upper plate 96 so that the emerging tube section can be seen by the operator. In the operation of the insertion section of the device, the individual shrink tube element which emerges from tube 16 is advanced to the right in FIGS. 3 and 4 from the output of tube 16 to an insertion position in front of an insertion guide chute 102. This initial positioning is done by a piston arm 104 which reciprocates within the guide channel defined by plates 94, 96 and 98. Piston arm 104 is controlled by air cylinder 106 which is in turn controlled by the foot pedal 20 shown in FIG. 1. Bottom and top plates 94 and 96 include elongated slots 94a and 96a respectively which define a guideway for a driving tip 108 of arm 104 which lies across the channel defined by plates 94, 96 and 98 in a direction perpendicular to the direction of the individual shrink tube sections. It is driving tip 108 which actually engages the shrink tube element and drives it from its emergence position in front of tube 16 to its waiting position directly in front of insertion guide 102.

Guide 102 is provided to assist the operator in inserting the wire connection in the waiting section of shrink tubing. Guide 102 is best seen in FIGS. 7 and 8. The guide itself is a half tube closed at its left side and open at its right which angles from left to right and terminates at the open end of shrink tube 14. The guide is mounted on mounting plate 110 (see FIG. 4) which is secured by a set screw 112. The mounting plate includes an elongated slot so that the relative lateral position of the guide can be adjusted in accordance with the size and end position of shrink tube section 14.

As can be seen in FIG. 4, piston arm 104 includes a shrink tube holdback bar 114 which blocks the opening of tube 16 as piston arm 104 travels across the channel defined by plates 94, 96 and 98 from its retracted position to its extended position carrying the lead shrink tube element to the waiting position in front of guide 102. Holdback bar 114 thus prevents a second shrink tube element from falling into the guide channel until arm 104 is again retracted. Alternatively the length of the piston tip can be extended to block tube 16 when the piston is advanced.

The connector shown in FIG. 8 is relatively flat and broad. This is typical of connectors currently in use. As a result of this connector shape, it is desirable that the section of shrink tubing positioned in front of guide chute 102 be deformed slightly into an oval shape rather than its normal circular shape to receive the connector. This is accomplished by adjusting the height of the guide channel between plate 94 and 96 such that the height decreases from the initial point where the shrink tube element emerges from tube 16 to the inserting position in front of chute 102. In order to accomplish this, the height of the upper plate 96 above lower plate 94 is adjustable by set screws 116 and 118 shown for example in FIG. 5. Set screw 116 (in FIG. 5) includes a screw shaft 120 which passes through an aperture in upper plate 96 and is threaded into lower plate 94. A spring 122 surrounds shaft 120 between plates 94 and 96 and is in constant compressed tension, thereby maintaining plate 96 tightly against set screw 116. A similar structure is provided at set screw 118. To further maintain the stability of top plate 96 and to maintain the rearward end of plate 96 stable, an angle support brace 124 reaches over plate 96 and a set screw 126 extends through brace 124 and downwardly into engagement with top plate 96 retaining top plate 96 in a stable position. As will be apparent from the enclosed drawing, set screws 116, 118 and 126 may be independently adjusted so that top plate 96 angles downwardly in the direction of travel of the shrink tube. A typical angled arrangement is shown in FIG. 9. The associated deformation of the shrink tube element as it travels from its initial position where it has just emerged from tube 16 (the leftmost position in FIG. 9) through an intermediate position (shown in broken line) to its rest position in front of insertion guide chute 102 (the rightmost position in FIG. 9) is also shown.

In addition to adjusting the deformation of the shrink tube as it is moved to position in front of guide chute 102, the insertion section is adapted to adjust the depth of penetration of the wire assembly and connector 26, 26a within the shrink tube element as the tube enters the heaters. Applicants have found that this adjustment is necessary to assure proper position of the tube on the connector after shrinkage. When shrink tube pieces are heated they shrink in the longitudinal as well as the radial direction. Different types of shrink tube materials shrink to a greater or lesser degree in the longitudinal direction. To permit applicants' device to handle shrink tube materials of different types, the penetration of the connector within the tube must be set so that after shrinkage the end of the tube and the connector are flush with one another or in any other desired relationship.

The penetration of the connector within the tube is adjusted by a variable stop 130 which is slidably mounted rearwardly of the guide channel on pins 132a, 132b, with stop 130 being biased rearwardly by springs 136a, 136b. The distance between the guide channel and adjustable stop 130 is controlled by screw 128 on threaded shaft 134. As will be seen in FIG. 4, adjustable stop 130 is mounted behind and parallel to fixed stop 98 and extends to the right of fixed stop 98 beyond the point where the conveyor picks up the wire assembly, beyond the end of fixed stop 98 and into the area where heat is applied to the tube. In operation, fixed stop 98 guides the shrink tube element as it travels from its initial position in front of feed tube 16 to its waiting position at guide chute 102. At the waiting position, fixed stop 98 also provides a stop for the wire assembly as it is inserted into the tube through guide 102, establishing a flush alignment of the tube end and the connector. After the conveyor picks up the assembly and before the assembly enters the heating section, the fixed stop 98 terminates and the shrink tube slides rearwardly on the connector (by gravity because the entire positioning and inserting section is sloped rearwardly downward as shown in FIGS. 5, 6 and 7) until it contacts adjustable stop 130. The position of stop 130 is adjusted by screw 128 in accordance with the specific type of shrink tubing being used so that an appropriate alignment of the connector and tube is established as the tube enters the heaters to assume proper alignment of the tube and connector after shrinkage.

The basic sequence of operation of applicants' system will thus be understood as follows:

A shrink tube element emerges from cylinder 16 in front of piston arm 104. The piston arm then advances through the guide channel driving the shrink tube member from initial position in front of tube 16 to a position directly behind guide chute 102. During this time, holdback bar 114 blocks the opening of tube 16 preventing a second shrink tube section from entering the guide channel. Piston arm 104 then withdraws along with holdback bar 114. When holdback bar 114 and piston arm 104 are withdrawn past the opening of tube 16, a second section of shrink tubing falls into the guide channel in position to be advanced to its insertion position when the operator is ready.

This cycle is controlled by the operator by use of foot pedal 20. Various different operating sequences can be employed but it has been found best to have arm 104 retracted at rest and to have it advance and deposit a shrink tube element when the foot pedal is depressed and then automatically return to its rest position regardless of whether the pedal is released.

After inserting the wire element to be covered in the tube section at the insertion position, the operator moves the wire assembly to the right where it is engaged by conveyors 28, 30 and carried through the heaters as set forth above, with the position of the tube on the connector being established by the position of adjustable stop 130.

It has been found that applicants' invention substantially increases the productivity of an operator applying shrink tubing and substantially reduces the cost of applying such tubing. At the same time, the fixed position of the shrink tube within applicants' apparatus and the controlled heating cycle results in more uniform application of shrink tube elements. Since the operator need not hold the wire assembly while it is being heated, the operator's safety is assured. Finally, applicants' lateral conveyor technique avoids tangling of wire assemblies and permits a uniform controlled heating cycle.

It is to be understood that the above-described arrangement is merely an example of the application of the principles of the present invention. Additional embodiments will be apparent to those skilled in the art without departing from the spirit or scope of the present invention as defined in the attached claims.

What is claimed is:

1. Apparatus for applying shrink tubing to a wire assembly or the like, comprising means for feeding individual sections of shrink tubing to a waiting position adjacent an operator location in an orientation adapted to receive said wire assembly, lateral conveyor means having a pickup point immediately adjacent said waiting position for grasping said wire assembly with said shrink tubing positioned thereon and for conveying said wire assembly away from said operator location, and heating means associated with said lateral conveyor for heating said shrink tubing section as it is transported by said conveyor to shrink said tubing and incapsulate a selected portion of said wire assembly.

2. Apparatus in accordance with claim 1 including means for dimensionally deforming said shrink tube section at said waiting position to facilitate insertion of said wire assembly.

3. Apparatus in accordance with claim 1 further including guide means for guiding said wire assembly into said shrink tube section at said waiting position.

4. Apparatus in accordance with claim 1 wherein said conveyor means comprising upper and lower conveyor belts traveling in opposite directions, the lower course of said upper conveyor belt and the upper course of said lower conveyor belt being in substantially continuous contact to securely grasp said wire assembly therebetween.

5. Apparatus in accordance with claim 2 including a fixed lower plate beneath the upper course of said lower conveyor belt and a plurality of roller arms bearing downwardly upon the lower course of said upper conveyor belt maintaining said conveyor belts in substantial continuous contact with one another and with said fixed plate.

6. Apparatus in accordance with claim 1 wherein said heating means comprises a forced hot air heating system including means for generating forced hot air, at least one horizontally disposed heating unit substantially parallel to and rearwardly of said conveyor for heating the end of said wire assembly protruding through said conveyor and manifold means communicating hot air from said source to said heater.

7. Apparatus in accordance with claim 1 further including means for adjusting the penetration of said wire assembly within said shrink tube section as the assembly enters said heating means so that the tube end and the end of the assembly are in a desired relationship after shrinkage.

* * * * *